(12) United States Patent
Lu

(10) Patent No.: US 8,080,294 B2
(45) Date of Patent: Dec. 20, 2011

(54) BIAXIALLY ORIENTED LLDPE BLENDS

(75) Inventor: Pang-Chia Lu, Pittsford, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 887 days.

(21) Appl. No.: 12/121,920

(22) Filed: May 16, 2008

(65) Prior Publication Data

US 2009/0286024 A1 Nov. 19, 2009

(51) Int. Cl.
*B32B 1/00* (2006.01)
*B32B 7/02* (2006.01)
*B29C 47/00* (2006.01)

(52) U.S. Cl. ..... 428/34.9; 428/218; 428/451; 264/176.1

(58) Field of Classification Search ............... 428/34.9, 428/218, 451; 264/176.1
See application file for complete search history.

(56) References Cited

U.S. PATENT DOCUMENTS

| | | | |
|---|---|---|---|
| 5,334,428 A | 8/1994 | Dobreski et al. | |
| 5,376,439 A * | 12/1994 | Hodgson et al. | 428/220 |
| 6,479,138 B1 | 11/2002 | Childress | |
| 6,969,741 B2 * | 11/2005 | Lustiger et al. | 525/240 |

FOREIGN PATENT DOCUMENTS

| | | |
|---|---|---|
| EP | 1 728 816 | 12/2006 |
| WO | WO2004/022634 | 3/2004 |
| WO | WO2004/031291 | 4/2004 |
| WO | WO2007/130277 | 11/2007 |

OTHER PUBLICATIONS

D.M. Fiscus and P. Brandt in "Oriented Exceed™ Metallocene LLDPE Films, A New Option in Oriented Films" in Technical Association of Paper and Pulp Industry (TAPPI) Polymers, Laminations and Coatings Conference, Aug. 1998.
D.M. Fiscus and P. Brandt in "Film Property Enhancement by Orienting Metallocene LLDPE" in Schotland Conference, Houston, Texas Sep. 1997 and New Plastics '98 Conference in London, England, Jan. 1998.
Agustin Tones, Nelson Coils and Facundo Mendez in Properties Predictor for HDP/LDPE/LLDPE Blends for Shrink Film Applications in Journal of Plastic Film & Sheeting, vol. 22—Jan. 2006.
U.S. Appl. No. 11/726,806, filed Mar. 23, 2007, Inventor: Sid R. Wright, et al., entitled Films for Use in High Strength Bags.

* cited by examiner

*Primary Examiner* — Michael M Bernshteyn
(74) *Attorney, Agent, or Firm* — Kevin M. Faulkner

(57) ABSTRACT

Disclosed in one aspect is a film comprising at least one core layer comprising a blend of at least 20 wt %, by weight of the core layer, of a first linear LLDPE having a molecular weight distribution (Mw/Mn) within the range of from 1.0 to 4.0; and at least 20 wt %, by weight of the core layer, of a second LLDPE—in a certain embodiment a short-chain branched LLDP—having a molecular weight distribution (Mw/Mn) within the range of from 1.0 to 7.0; characterized in that the density of the second LLDPE is greater than the density of the first LLDPE by at least 0.002 g/cm$^3$; and/or the $I_2$ of the second LLDPE is greater than the $I_2$ of the first LLDPE by at least 0.5 dg/min. In certain embodiments, the first and second LLDPEs are produced by a metallocene-catalyzed reaction. In yet another embodiment, the combined molecular weight distribution (Mw/Mn) of the first and second LLDPEs is greater than 4.0.

13 Claims, No Drawings

BIAXIALLY ORIENTED LLDPE BLENDS

FIELD OF THE INVENTION

The present invention relates to polyethylene-based films, and more particularly relates to biaxially oriented films comprising linear low density polyethylenes having single-site catalyzed characteristics, and also relates to linear low density polyethylenes having improved processability.

BACKGROUND OF THE INVENTION

It has been known to use metallocene-catalyzed polyethylenes, especially "mLLDPE" to make films. Such films offer toughness that is superior to other LLDPEs. This and other advantages of mLLDPE films is discussed by D. M. Fiscus and P. Brandt in "Oriented Exceed™ Metallocene LLDPE Films, A New Option in Oriented Films" in TECHNICAL ASSOCIATION OF PAPER AND PULP INDUSTRY (TAPPI) POLYMERS, LAMINATIONS AND COATINGS CONFERENCE, August 1998; and by the same authors in "Film Property Enhancement by Orienting Metallocene LLDPE" in SCHOTLAND CONFERENCE, Houston, Tex. September 1997 and NEW PLASTICS '98 CONFERENCE in London, England, January 1998. Such films also offer improved optics as well as low levels of extractables and blocking resistance. These improvements have allowed converters to down gauge the films, thus lowering the cost. However, processing these mLLDPE is somewhat challenging due to the relatively low viscosity due in part to the narrow molecular weight distribution of the mLLDPEs. Forming biaxially oriented films—those possessing transverse direction orientation ("TDO") and machine direction orientation ("MDO")—from mLLDPEs is thus challenging.

There has been at least one disclosure of the blending of two or more LLDPEs having metallocene-like characteristics, such as in U.S. Ser. No. 11/726,806. However, the blend disclosed in that case was such that the second mLLDPE made up less than 10 wt % of the composition of the film layer. Thus, an improvement in processability is not seen. Other relevant disclosures include WO 2007/130277, WO 2004/031291 and WO 2004/022634 that discuss the use of one or more LDPEs and/or LLDPEs for films. There is still a desire to improve the processability of LLDPEs having metallocene-like properties, while maintaining their advantageous properties.

The inventor has found that processability can be improved for mLLDPEs (or LLDPEs that possess certain properties similar to those of many mLLDPEs) by either blending at least two mLLDPE of different density and/or melt index, or by blending in a short chain branched LLDPE having improved processability. It is believed that the blends, or the short chain branched LLDPE alone, possess somewhat broader molecular weight distributions and thus improved processability is achieved without losing the desirable toughness of mLLDPEs.

SUMMARY OF THE INVENTION

Disclosed in one aspect is a film comprising at least one core layer comprising a blend of at least 20 wt %, by weight of the core layer, of a first linear LLDPE having a molecular weight distribution (Mw/Mn) within the range of from 1.0 to 4.0, a density within the range of from 0.890 to 0.920 g/cm³ and an $I_2$ within the range of from 0.1 to 4.0 dg/min; and at least 20 wt %, by weight of the core layer, of a second LLDPE having a molecular weight distribution (Mw/Mn) within the range of from 1.0 to 7.0, a density within the range of from 0.900 to 0.935 g/cm³ and an $I_2$ within the range of from 0.5 to 10.0 dg/min; characterized in that the density of the second LLDPE is greater than the density of the first LLDPE by at least 0.002 g/cm³; or the $I_2$ of the second LLDPE is greater than the $I_2$ of the first LLDPE by at least 0.5 dg/min.

In certain embodiments, the first and second LLDPEs are produced by a metallocene-catalyzed reaction. In yet another embodiment, the combined molecular weight distribution (Mw/Mn) of the first and second LLDPEs is greater than 4.0 or 5.0.

In another aspect is a method for producing a film comprising at least one core layer comprising providing a short chain branched LLDPE (scb-LLDPE) having a molecular weight distribution (Mw/Mn) within the range of from 2.0 to 7.0, a density within the range of from 0.900 to 0.935 g/cm³, an $I_2$ within the range of from 0.1 to 10.0 dg/min and an $I_{21}$ within the range of from 10.0 to 80.0 dg/min; melt blending the scb-LLDPE with 50 wt % or less, by weight of the core layer, of core additives to form a core composition; and extruding a film comprising the at least one core layer comprising scb-LLDPE; characterized in that when extruding the core composition in an extruder having a feed block and a 100 mesh (149 μm, U.S. Standard) screen upstream of the feed block, and a L/D ratio within the range of from 25/1 to 35/1, that there is a 33% or less difference between the pressure at the screen and the pressure at the feed block.

The films described herein comprise at least two layers, a core layer comprising a core composition and a skin layer comprising a skin composition. In certain embodiments, the film is at least a three layer film comprising two skin layers, the core layer sandwiched there between.

Among other utilities, the films described herein, biaxially oriented films in a particular embodiment, are useful as shrink films for labels, packaging, etc.

The various descriptive elements and numerical ranges disclosed herein can be combined with other descriptive elements and numerical ranges to describe preferred embodiments of the invention(s); further, for a given element, any upper numerical limit can be combined with any lower numerical limit described herein.

DETAILED DESCRIPTION OF THE INVENTION

Described herein are biaxially oriented polyethylene-based films that are based on polyethylenes, and in particular, those having metallocene-like properties. What is described are blends of such polyethylenes that exhibit improved properties over compositions comprising only one type of polyethylene, or comprising only minor amounts (less than 10-15 wt %) of other types of polyethylenes. More particularly, what is described in one aspect is a film comprising at least one core layer comprising a blend of at least 20 wt %, by weight of the core layer, of a first linear low density polyethylene ("LLDPE"); and at least 20 wt %, by weight of the core layer, of a second LLDPE, wherein the density and/or the melt index ($I_2$, ASTM D1238, 190° C./2.16 kg) of the second LLDPE is greater than the density and/or $I_2$ of the first LLDPE, both LLDPEs preferably exhibiting properties characteristic of metallocene-catalyzed LLDPEs. The films possess a high degree of transparency; possessing a haze value of less than 15% or 12% or 10% in certain embodiments.

In certain embodiments, the density of the second LLDPE is greater than the density of the first LLDPE by at least 0.002 g/cm³, and by at least 0.003 g/cm³ in another embodiment, and by at least 0.004 g/cm³ in yet another embodiment, and at least 0.005 g/cm³ in yet another embodiment, at least 0.010 g/cm³ in yet another embodiment. Also, in certain embodiments, the I₂ of the second LLDPE is greater than the I₂ of the first LLDPE by at least 0.5 dg/min, and at least 0.8 dg/min in another embodiment, and at least 1 dg/min in yet another embodiment, and at least 2 dg/min in yet another embodiment.

In certain embodiments, from 20 to 80 wt %, by weight of the core layer, of a first linear low density polyethylene (LLDPE) is present, and from 30 to 70 wt % in another embodiment, and from 40 to 60 wt % in yet another embodiment, and at least 20 wt % in yet another embodiment, and at least 30 wt % in yet another embodiment. Also in certain embodiments, from 80 to 20 wt %, by weight of the core layer, of a second LLDPE is present, and from 70 to 30 wt % in another embodiment, and from 60 to 40 wt % in yet another embodiment, and at least 20 wt % in yet another embodiment, and at least 30 wt % in yet another embodiment.

In certain embodiments, the core layer comprises the blend, in the weight percentages stated herein, of the first and second LLDPEs. In another embodiment, the core layer consists essentially of the blend of the first and second LLDPEs.

The LLDPEs described herein comprise copolymers of ethylene-derived units ("ethylene") and at least one type of comonomer. Suitable comonomers include $C_3$-$C_{20}$ α-olefins, preferably $C_3$-$C_8$ α-olefins, $C_5$-$C_{20}$ cyclic olefins, preferably $C_7$-$C_{12}$ cyclic olefins, $C_7$-$C_{20}$ vinyl aromatic monomers, preferably styrene, and $C_4$-$C_{20}$ geminally disubstituted olefins, preferably isobutylene. The most preferred comonomers include propylene, 1-butene, 1-hexene, 4-methyl-1-pentene and 1-octene. The comonomers are present in the LLDPE within the range of from 0.5 to 30 wt % in certain embodiments, and within the range of from 1 to 20 wt % in another embodiment, and within the range of from 2 to 18 wt % in yet another embodiment.

In certain embodiments, the LLDPEs possess a molecular weight distribution (Mw/Mn), as determined by Gel Permeation Chromatography, within the range of from 1.0 or 1.2 or 1.4 to 2.5 or 3.0 or 3.5 or 4.0. Also, in certain embodiments, the LLDPEs described herein also possess a xylene solubles value of less than 5 wt %, and less than 4 wt % in another embodiment, and less than 3 wt % in yet another embodiment, and less than 2 wt % in yet another embodiment (Soxhlet extraction at 23° C., 24 hours in xylene).

In certain embodiments, the first LLDPE has a density within the range of from 0.890 to 0.920 g/cm³, and within the range of from 0.900 to 0.918 g/cm³ in another embodiment, and within the range of from 0.905 to 0.920 g/cm³ in yet another embodiment. Also, in certain embodiments the first LLDPE has an I₂ within the range of from 0.1 to 4.0 dg/min, and within the range of 0.2 to 3.0 dg/min in another embodiment, and within the range of 0.5 to 2.0 in yet another embodiment.

In certain embodiments, the second LLDPE has a density within the range of from 0.900 to 0.935 g/cm³, and within the range of from 0.905 to 0.925 g/cm³ in another embodiment, and within the range of from 0.910 to 0.922 g/cm³ in yet another embodiment. Also, in certain embodiments the second LLDPE has an I₂ within the range of from 0.5 to 10.0 dg/min, and within the range of 0.8 to 8.0 dg/min in another embodiment, and within the range of from 1.0 to 6.0 dg/min in yet another embodiment. In certain embodiments, the second LLDPE is a short chain branched LLDPE as described below. Examples of commercially suitable LLDPEs for the first and/or second LLDPE include the Exceed™ series of polyethylenes (ExxonMobil Chemical Co.)

In certain embodiments, the films comprise a short chain branched LLDPE ("scb-LLDPE"), comprising ethylene-derived units and α-olefin derived units as described above. In certain embodiments, the molecular weight distribution (Mw/Mn), as determined by Gel Permeation Chromatography, is within the range of from 2.0 or 2.5 or 2.8 to 5.0 or 5.5 or 6.0 or 7.0. In certain embodiments, the scb-LLDPE has a density within the range of from 0.900 to 0.935 g/cm³, and within the range of from 0.910 to 0.930 g/cm³ in another embodiment, and within the range of from 0.905 to 0.925 g/cm³ in yet another embodiment. Also, in certain embodiments the scb-LLDPE has an I₂ within the range of from 0.1 to 10.0 dg/min, and within the range of 0.2 to 8.0 dg/min in another embodiment, and within the range of from 0.5 to 6.0 in yet another embodiment. Also, in certain embodiments the scb-LLDPE has an I₂₁ (190° C., 21.6 kg) within the range of from 10.0 to 80.0 dg/min, and within the range of 12.0 to 60.0 dg/min in another embodiment, and within the range of from 12.0 to 40.0 in yet another embodiment.

The scb-LLDPEs also can be characterized by the presence of substantial short chain branching ("SCB"). Short chain branching in these LLDPEs can determined by ¹H NMR (hydrogen nuclear magnetic resonance) with data collected at 500 MHz. Spectra were referenced by setting the polymer backbone signal to 1.347 ppm. The methyl group content in ethylene-α-olefin copolymers were calculated from the HNMR spectrum using the following formula (I):

$$\text{Methyl Groups}/1000 \text{ carbons} = (I_{CH3} \cdot 0.33 \cdot 1000)/(I_{0.5\text{-}2.1ppm} \cdot 0.5) \quad (1)$$

where $I_{CH3}$ is the normalized methyl signal area in the region between 0.88 and 1.05 ppm and $I_{0.5\text{-}2.1ppm}$ the area between 0.50 and 2.10 ppm. The amount of methyl groups will correspond to the number of short chain branches in the polymer assuming that the short chain branches contain one methyl (—CH₃) group and that all methyl groups are a result of short chain branching. The same NMR method can be used to determine vinyl end unsaturation. In certain embodiments, the degree of SCB in the sbc-LLDPEs is within the range of from 5 to 50 branches per 1000 carbon atoms, and from 8 to 40 in another embodiment, and from 10 to 30 in yet another embodiment.

The scb-LLDPEs described herein can also be described as having a characteristic Composition Distribution Breadth Index ("CDBI"). The definition of the CDBI, and the method of determining CDBI, can be found in U.S. Pat. No. 5,206,075 and WO 93/03093. The CDBI is the weight percent of the ethylene interpolymer molecules having a comonomer content within 50% of the median total molar comonomer content. The CDBI of an ethylene homopolymer is 100%. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in *Wild*, et al., 20 J. POLY. SCI., POLY. PHYS. ED., 441 (1982). To determine CDBI, a solubility distribution curve is first generated for the copolymer. This may be accomplished using data acquired from the TREF technique. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a Mn≧15,000, where Mn is the number average molecular weight of the fraction. Any low weight fractions present generally represent a trivial portion of the polymer. The remainder of this description and the appended claims maintain this convention of assuming all fractions have $Mn \geqq 15{,}000$ in the CDBI measurement. In certain embodiments, the scb-LLDPEs described herein possess a CDBI of at least 70% or at least 75% or at least 80%. Examples of commercially suitable scb-LLDPEs include the Enable™ series of polyethylenes (ExxonMobil Chemical Co.).

The LLDPEs described herein can be made by any suitable polymerization process known, and in a particular embodiment are made using a metallocene catalyst using any known process such as discussed by S. P. Chum, C. I. Kao and G. W. Knight in 1 METALLOCENE-BASED POLYOLEFINS 262 (J. Scheirs and W. Kaminsky, eds., Wiley 2000), including the high-pressure process, solution process, gas phase process, and slurry process. In certain embodiments, the first and/or second LLDPEs, as well as the scb-LLDPEs are produced by a metallocene-catalyzed process, and an appropriate activator, with or without a support. However, there may be other catalysts that are single-site catalysts (e.g., Group 4-10 thiazol- or amine-coordination catalysts such as $\{[(\text{pentamethylphenyl})\text{NCH}_2\text{CH}_2]_2\text{NH}\}\text{Zr}(\text{CH}_2\text{C}_6\text{H}_5)_2$ and the like) or equivalents thereof that produce LLDPE having metallocene-like properties as disclosed by Chum et al.; such properties including a relatively narrow MWD, low level of extractables, even distribution of comonomer, and sharp melting curves.

As stated above, what is described in one aspect is a film comprising at least one core layer comprising a blend of at least 20 wt %, by weight of the core layer, of a first LLDPE; and at least 20 wt %, by weight of the core layer, of a second LLDPE. In certain embodiments, the film(s) described herein further comprise at least one skin layer adjacent to the at least one core layer, wherein the skin layer comprises a skin layer LLDPE. In other embodiments, there are two skin layers, the core layer comprising (or consisting of) the LLDPE blend, being adjacent to and sandwiched there between the skin layers. The skin layers, when present, can be made by any suitable material known in the art for producing films, and in particular, shrink films, of which the films described herein have particular utility. The skin layer(s), when present, may include antiblock agents as is known in the art, as well as other additives such as antioxidants, UV protectors, etc. In certain embodiments, the skin layer(s) comprise a material described as the first LLDPE.

The films described herein have at least 2 or 3 layers, and at least 5 layers in a particular embodiment. The films typically have at least two skin layers that are bound to the core layer on one face, and are unbound (face away from the film) on the other face. However, the films can include structures in which there are skin layers sandwiched between other layers. In certain embodiments, the skin layer(s) can be bound directly to the core; or have a "tie-layer" in between as is known in the art. If each skin layer is labeled "S", and each core layer labeled "C", and an optional tie layer labeled "T" which in some instances is used to adhere layer to one another, then preferable film structures include, but are not limited to SCS, SC, SSCSS, STC, STCTS, SSCS, STSCTSTS, SSTCCTSS, STSTCCTSTS, STTCTTS, SSSCTS, SSTCTS, SCCS, SCSCS, and other such structures. In the films described herein, each individual skin layer may be the same or different, preferably the same, in composition compared to other skin layers in the same film. Also, each core layer may be the same or different. Furthermore, for example, there may be a skin layer in a film that does not meet the description of "comprising a styrenic copolymer or a polyester copolymer," as is also true of multiple tie and core layers. Thus, for example, the film structures above might be represented by $S^1CS^2$, $S^1S^2CS^1$, etc., wherein "$S^1$" and "$S^2$" are distinct from one another, meaning that they comprise different materials, and/or the same materials but in different ratios. Preferably, however, each skin layer, core layer, and when present, each tie layer, that makes up a film will have similar or identical identities, as this type of structure allows the use of only three extruders to melt blend and extrude the materials that form each layer of the film.

As used herein, the term "layer" refers to each of the one or more materials, the same or different, that are secured to one another in the form of a thin sheet or film by any appropriate means such as by an inherent tendency of the materials to adhere to one another, or by inducing the materials to adhere as by a heating, radiative, chemical, or some other appropriate process. The term "layer" is not limited to detectable, discrete materials contacting one another such that a distinct boundary exists between the materials. Preferably however, the materials used to make one layer of a film will be different (i.e., the weight percent of components, the properties of each component, and/or the identity of the components may differ) from the materials used to make an adjacent, and adhering, layer. The term "layer" includes a finished product having a continuum of materials throughout its thickness. The "films" described herein comprise three or more layers, and may comprise 3, 4, 5 or more layers in particular embodiments.

The films herein are also characterized in certain embodiments as being biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the "tentered" method. In the tentered process, line speeds of greater than 100 m/min to 400 m/min or more, and outputs of greater than 2000 kg/hr to 4000 kg/hr or more are achievable. In the tenter process, sheets/films of the various materials are melt blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, or cause it to become tacky and adhere to the equipment, but high enough to facilitate the machine direction orientation process. Such temperatures referred to herein refer to the film temperature itself. The film temperature can be measured by using, for example, InfraRed spectroscopy, the source aimed at the film as it is being processed; those skilled in the art will understand that for transparent films, measuring the actual film temperature will not be as precise. In this case, those skilled in the art can estimate the temperature of the film by knowing the temperature of the air or roller immediately adjacent to the film measured by any suitable means. The heating means for the film line may be set at any appropriate level of heating, depending upon the instrument, to achieve the stated film temperatures.

The lengthened and thinned film is cooled and passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, or cause it to become tacky and adhere to the equipment, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the film temperature is lowered by at least 2° C. but typically no more than 20° C. relative to the pre-heat temperature to maintain the film temperature so that it will not melt the film. After stretching to achieve transverse orientation in the film, the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching it at a temperature below the pre-heat temperature of the film, and then followed by a cooling step at yet a lower temperature. In one embodiment, the films described herein are formed by imparting a transverse orientation by a process of first pre-heating the film, followed by a decrease in the temperature of the film within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° C. relative to the stretching temperature, holding or slightly decreasing (by no more than 5%) the amount of stretch, to allow the film to "anneal." The latter step imparts the high TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 8-fold TD orientation and at least a 2 or 3 or 4-fold MD orientation. Being so formed, the at least three-layer (one core, two skin layers, 18-21 μm thickness) possess an ultimate tensile strength within the range of from 100 or 110 to 80 or 90 or 200 MPa in the TD in certain embodiments; and possess an ultimate tensile strength within the range of from 30 or 40 to 150 or 130 MPa in the MD in other embodiments. Further, the SCS films described herein possess an MD Elmendorf tear is greater than 10 or 15 g in certain embodiments, and the TD Elmendorf tear is greater than 15 or 20 g in other embodiments.

The films described herein have a particular utility as shrink films due in part to their biaxial orientation. In certain embodiments, the films described herein, especially the three-layer films, have a TD shrinkage of greater than 40 or 50 or 60% at 116° C., and have a TD shrinkage within the range of from 20 or 30 to 50 or 60 or 80% at 116° C. in other embodiments. In certain embodiments the films, the three-layer films, have an MD shrinkage of less than 35 or 40% at 116° C., and an MD shrinkage within the range of from 10 or 20 or 30 to 40 or 50% at 116° C.

In certain embodiments, the film(s) described herein include or exclude certain materials. In one embodiment, low density polyethylene produced in a high pressure radical-induced process ("HP-LDPE") is substantially absent from the core (or composition making up the core), meaning that it is not present in any detectable amount. In another embodiment, high density polyethylene ("HDPE," having a density of greater than 0.940 g/cm$^3$) is substantially absent from the core layer (or composition making up the core), meaning that it is not present in any detectable amount. In other embodiments, the core further comprises low density polyethylene produced in a high pressure radical-induced process within the range of from 0.1 to 10 or 15 wt % based on the weight of the core layer. In yet other embodiments, cavitation and/or opacity-inducing agents are substantially absent, meaning that they are not present in the core in any detectable amount. Examples of cavitation and/or opacity-inducing agents includes calcium carbonate, talc, carbon black, clay, untreated silica and alumina, zinc oxide, mica, asbestos, barites, kieselguhr, magnesium carbonate and mixtures thereof, as well as those materials made from polybutylene terephthalate, nylon-6, cyclic olefin copolymers particles, and other particles that are phase-distinct from the core layer material, and having a size that, during orientation, will create cavities in the core layer.

In embodiments where fillers and other opacity-inducing materials are substantially absent from the three-layer films (SCS), the haze value of the films is less than 15% or 12% or 10%.

In certain embodiments, the films comprising the core layer can also comprise, or consist essentially of, the scb-LLDPE, and comprise (or consist essentially of) a blend of any of the LLDPEs described herein and the scb-LLDPE. In certain aspects, compositions including the scb-LLDPE for making films are advantaged in being easier to process in most extruder/film manufacturing equipment. This improved ease of processing is characterized in certain embodiments as a decrease in the back pressure within the extruder that is melt blending the scb-LLDPE composition in forming the films. The decrease in back pressure relative to other mLLDPEs (such as the first and second LLDPEs described above) can be up to a 5 or 10 or 15 or 20% decrease. Likewise, a lower amperage is used in the extruder to extrude the scb-LLDPE by greater than 5 or 10% relative to other mLLDPEs as described herein for the first and second LLDPEs.

Thus, in certain embodiments is a method for producing a film comprising at least one core layer comprising providing a scb-LLDPE having a molecular weight distribution (Mw/Mn) as described above, a density as described above, an $I_2$ and an $I_{21}$ as described above for the scb-LLDPE; melt blending the scb-LLDPE with 50 wt % or less, by weight of the core layer, of core additives to form a core composition; and extruding a film comprising the at least one core layer comprising scb-LLDPE; characterized in that when extruding the core composition in an extruder having a feed block and a 100 mesh (149 μm, U.S. Standard) screen upstream of the feed block, and a L/D ratio within the range of from 10/1 or 25/1 to 35/1 or 60/1, that there is a 33 or 32 or 31% or less difference between the pressure at the screen and the pressure at the feed block.

In certain embodiments, the "scb-LLDPE" core comprises within the range of from 50 to 100 wt % of the scb-LLDPE by weight of the core, and from 60 to 95 wt % in another embodiment, and from 70 to 90 wt % in yet another embodiment, and consists essentially of the scb-LLDPE in yet another embodiment.

The "additives" in this case can be other polymers such as high pressure LDPE, the first and/or second LLDPEs, other LLDPEs such as Ziegler-Natta produced LLDPEs and other LDPEs. The additives can make up the remainder of the core.

In certain embodiments, the film(s) comprise at least one core layer and at least one skin (as described above), wherein the core comprises the scb-LLDPE in the amounts stated herein, and consists essentially of the scb-LLDPE in another embodiment.

The films described herein have utility in many applications. Certain applications are ideal such as, for example, trash liners, labeling (especially shrink film labels), covering, and/or packaging of materials such as bottles, tubes and other cylindrical articles, especially bottles, tubes and cylindrical articles having a contoured shape. Other uses of the films include covering boxes, plates, fresh produce bags, shrink bundling, heavy wall sacks, vertical form fill and seal packaging, peelable seals and capacitor films.

EXAMPLES OF THE INVENTION

Three-layered films were produced having various core compositions comprising metallocene-produced LLDPE, and blends thereof, as outlined in Table 1. Examples 1-10 are inventive examples, and Examples 11 and 12 are comparative examples. The core was sandwiched between two mLLDPEs, Exceed™ 3512 resins (3.5 dg/min melt index, 0.912 g/cm$^3$ density, ExxonMobil Chemical Co.). The co-extrusions and film production was performed using a Semiworks line with a 3.5 inch (89 mm) extruder having a 32/1 L/D ratio single screw extruder having a 40/80/100/40 mesh (U.S. Standard) multi-screen for the core layer extrusion, the film formed in a tenter orientation process. The operating conditions for extruding and forming each example and comparative film are in Table 2. The transverse direction orientation ("TDO") portion of the tenter film machine has a 3-temperature zone configuration, and in Table 2 the pre-heat, stretch (slightly cooler), and anneal (even cooler) stages of the TDO are given. The following components were used to make the core layer (all Exceed™ and Enable™ linear low density polyethylene resins were obtained from ExxonMobil Chemical Co.):

mLL$^a$, Enable™ 20-10, 1.0 dg/min melt index, 0.920 g/cm$^3$ density, mLL$^b$, Exceed™ 1012, 1.0 dg/min melt index, 0.912 g/cm$^3$ density, mLL$^c$, Exceed E-1327, 1.3 dg/min melt index, 0.927 g/cm$^3$ density, mLL$^d$, Exceed 1018, 1.0 dg/min melt index, 0.918 g/cm$^3$ density, N, nucleator in LDPE carrier, Hyperform™ HL3-4 (Milliken), LD, LDPE (high pressure, LD-100BW, ExxonMobil Chemical Co.), 2.0 dg/min melt index, 0.922 g/cm$^3$ density.

The "melt index" is measured according to ASTM 1238 at 190° C. and 2.16 kg. The other properties of each film are outlined in Tables 3 and 4. Other test methods are as follows:

Tensile modulus and ultimate tensile strength was measured according to ASTM D882.

Density is measured according to ASTM-D1505 for plastic materials.

Haze is reported as a percentage (%), was measured as specified by ASTM D1003.

Elongation was measured according to ASTM D882.

Water vapor transmission rate may also be measured by a reliable method, such as ASTM F1249. In particular, WVTR may be measured with a Mocon PERMATRAN W600 instrument (available from Modern Controls, Inc., Elk River, Minn.) at 38° C. and 90% relative humidity.

Test procedure for Puncture is ExxonMobil Test method SOP-PAL-060 (Revision 03).

Test procedure for Elmendorf tear is ASTM D1922.

The percentage of shrink (dimensional stability) was measured according to ExxonMobil Chemical Test Procedure, a modification of ASTM D1204. The two tests follow the same principles but differ in some specific protocols. According to the EMCT Procedure, the measurement test involves placing a 2.54 cm by 17.78 cm film sample in a convection oven controlled to a target temperature (typically 135° C.) for 7 minutes and reporting the change from the original dimension as a percentage value. For MD shrink %, the sample is long (17.78 cm) in the MD direction and short (2.54 cm) in the TD direction and vice versa for TD shrink %. Thus, MD shrink percentage=(initial MD dimension-final MD dimension)/(initial MD dimension)]×100. For low to non-shrink polypropylene films, percent dimensional stability is reported instead of shrink percentage. MD percent dimensional stability=[(final MD dimension-initial MD dimension)/(initial MD dimension)]×100.

TABLE 1

Makeup of the Sample Films
Core Layer Composition (wt %)

| Sample Number | mLL$^a$ | mLL$^b$ | mLL$^c$ | mLL$^d$ | LD | N |
|---|---|---|---|---|---|---|
| 1 | 100 | — | — | — | — | — |
| 2 | 100 | — | — | — | — | — |
| 3 | 90 | — | — | — | 10 | — |
| 4 | 88 | — | — | — | 10 | 2 |
| 5 | 44 | 44 | — | — | 10 | 2 |
| 6 | 45 | 45 | — | — | 10 | — |
| 7 | 50 | — | 50 | — | — | — |
| 8 | — | 45 | 45 | — | 10 | — |
| 9 | — | 44 | 44 | — | 10 | 2 |
| 10 | — | 45 | — | 45 | 10 | — |
| 11 | — | — | — | 88 | 10 | 2 |
| 12 | — | — | — | 90 | 10 | — |

TABLE 2

Extruder and Film Line Conditions During Film Production

| Sample Number | Core Extruder Temp, °C. | P before S/C, psi | P @ feedblk, psi | amp | MDO | MDO, amp | MDO Temp, °C. | TDO | TDO, amp | TDO temp, °C. |
|---|---|---|---|---|---|---|---|---|---|---|
| 1 | 260 | 1890 | 1310 | 99 | 3.5 | 4.0/2.9/6.7 | 86 | 8 | 17.2 | 118/114/110 |
| 2 | — | — | — | — | 4.0 | — | — | — | — | — |
| 3 | 260 | 1800 | 1310 | 96 | 3.5 | 4.7/3.3/6.3 | 86 | 8 | 17.4 | 118/114/110 |
| 4 | 260 | 1760 | 1260 | 90 | 3.5 | 4.3/3.2/6.2 | 86 | 8 | 15.6 | 117/113/110 |
| 5 | 260 | 1960 | 1410 | 105 | 3.5 | 4.0/2.9/5.7 | 86 | 8 | 17.5 | 116/113/110 |
| 6 | 260 | 1950 | 1430 | 104 | 3.5 | 4.4/2.9/6.1 | 86 | 8 | 15.9 | 116/113/110 |
| 7 | 260 | 2050 | 1390 | 127 | 4.5 | 3.5/3.1/8.6 | 88 | 8 | 14.6 | 128/121/110[1] |
| 8 | 260 | 2170 | 1550 | 123 | 3.5 | 4.6/3.3/6.8 | 86 | 8 | 14.0 | 123/118/110 |
| 9 | 260 | 2210 | 1560 | 126 | 3.5 | 4.3/3.4/6.7 | 86 | 8 | 15.2 | 123/118/110 |
| 10 | 260 | 2430 | 1480 | 137 | 3.5 | 4.0/3.3/6.9 | 86 | 8 | 15.3 | 124/119/110 |
| 11 | 260 | 2680 | 1720 | 149 | 3.5 | 5.1/3.8/7.7 | 86 | 8 | 14.4 | 125/118/110 |
| 12 | 260 | 2670 | 1720 | 140 | 3.5 | 4.9/3.5/7.6 | 88 | 8 | 14.0 | 125/118/110 |

[1]due to higher MD draw orientation, a higher TDO ("transverse direction orientation") temperature was needed.

TABLE 3

Properties of the Films

| Sample No. | Haze, % | WVTR, g/m² | Thick, μm | Modulus, MPa MD | Modulus, MPa TD | Ultimate Tensile, MPa MD | Ultimate Tensile, MPa TD | % Elongation MD | % Elongation TD |
|---|---|---|---|---|---|---|---|---|---|
| 1 | 12.1 | 17.9 | 20 | 379 | 1109 | 76 | 165 | 275 | 52 |
| 2 | 10.8 | — | 19 | 352 | 1164 | 83 | 165 | 280 | 44 |
| 3 | 6.4 | 19.5 | 19 | 345 | 1123 | 76 | 158 | 298 | 43 |
| 4 | 10.2 | 19.4 | 20 | 413 | 1013 | 48 | 152 | 189 | 54 |
| 5 | 7.1 | 20.2 | 19 | 227 | 1054 | 76 | 172 | 295 | 59 |
| 6 | 7.0 | 20.6 | 20 | 255 | 875 | 83 | 165 | 285 | 55 |
| 7 | 66.2 | 16.7 | 18 | 248 | 1158 | 110 | 124 | 199 | 38 |
| 8 | 4.1 | 17.0 | 18 | 358 | 1488 | 83 | 186 | 311 | 56 |
| 9 | 3.1 | 16.9 | 20 | 331 | 1075 | 83 | 165 | 301 | 60 |
| 10 | 4.5 | 14.1 | 20 | 434 | 1357 | 90 | 192 | 298 | 44 |
| 11 | 22.7 | — | 21 | 227 | 999 | 96 | 138 | 268 | 53 |
| 12 | 16.0 | 18.3 | 20 | 214 | 944 | 90 | 124 | 279 | 44 |

TABLE 4

Properties of the Films

| Sample No. | Dimensional Stability 93° C. MD | Dimensional Stability 93° C. TD | Dimensional Stability 116° C. MD | Dimensional Stability 116° C. TD | Elmendorf Tear, g MD | Elmendorf Tear, g TD | Puncture Resistance Peak Load lb-f | Puncture Resistance Break Load lb-in | Puncture Resistance Energy To Break N | Puncture Resistance Energy To Break J |
|---|---|---|---|---|---|---|---|---|---|---|
| 1 | −2.2 | −7.9 | −33 | −69 | 18 | 1 | 3.4 | 41 | 15.2 | 0.06 |
| 2 | −2.0 | −8.2 | −32 | −65 | 10 | 1 | 3.1 | 38 | 13.9 | 0.05 |
| 3 | −2.0 | −7.5 | −33 | −71 | 15 | 0 | 2.8 | 34 | 12.5 | 0.05 |
| 4 | −2.5 | −8.4 | −35 | −68 | 16 | 1 | 3.1 | 37 | 13.7 | 0.05 |
| 5 | −2.7 | −10.0 | −35 | −69 | 20 | 3 | 3.3 | 40 | 14.8 | 0.06 |
| 6 | −2.9 | −9.9 | −34 | −68 | 24 | 75 | 3.3 | 40 | 14.7 | 0.06 |
| 7 | −4.0 | −4.5 | −31 | −28 | 4 | 25 | 2.4 | 29 | 10.7 | 0.03 |
| 8 | −1.9 | −7.2 | −15 | −47 | 20 | 20 | 3.1 | 37 | 13.9 | 0.06 |
| 9 | −1.7 | −7.7 | −15 | −45 | 21 | 27 | 3.2 | 38 | 14.1 | 0.06 |
| 10 | −1.7 | −6.2 | −13 | −37 | 26 | 61 | 4.0 | 48 | 18.0 | 0.07 |
| 11 | −1.7 | −6.6 | −18 | −41 | 12 | 42 | 2.9 | 35 | 12.8 | 0.05 |
| 12 | −1.4 | −6.7 | −18 | −41 | 8.5 | 44 | 2.5 | 30 | 11.0 | 0.04 |

Having described the various features of the inventive films(s) and how to make them, set forth below are certain numbered embodiments of the invention as related to one another:

1. A film comprising at least one core layer comprising a blend of:
   from 20 to 80 wt %, by weight of the core layer, of a first linear low density polyethylene (LLDPE) having a molecular weight distribution (Mw/Mn) within the range of from 1.0 to 4.0, a density within the range of from 0.890 to 0.920 g/cm$^3$ and an $I_2$ within the range of from 0.1 to 4.0 dg/min; and
   from 80 to 20 wt %, by weight of the core layer, of a second LLDPE having a molecular weight distribution (Mw/Mn) within the range of from 1.0 to 7.0, a density within the range of from 0.900 to 0.935 g/cm$^3$ and an $I_2$ within the range of from 0.5 to 10.0 dg/min;
   wherein the density of the second LLDPE is greater than the density of the first LLDPE by at least 0.002 g/cm$^3$; or the $I_2$ of the second LLDPE is greater than the $I_2$ of the first LLDPE by at least 0.5 dg/min.
2. The film of numbered embodiment 1, further comprising at least one skin layer adjacent to the at least one core layer, wherein the skin layer comprises a skin layer LLDPE.
3. The film of numbered embodiment 2, wherein the skin layer LLDPE has an $I_2$ within the range of from 1.0 to 5.0 dg/min, and a density within the range of from 0.900 to 0.925 g/cm$^3$.
4. The film of numbered embodiment 3, wherein there are two skin layers, the core layer being adjacent to and sandwiched there between.
5. The film of numbered embodiment 4, wherein the film is biaxially oriented with at least a 6-fold TD orientation and at least a 3-fold MD orientation.
6. The film of numbered embodiment 5, wherein the MD ultimate tensile strength within the range of from 30 to 130 MPa and the TD ultimate tensile strength within the range of from 100 to 200 MPa.
7. The film of numbered embodiment 5, wherein the MD Elmendorf tear is greater than 10 g, and the TD Elmendorf tear is greater than 15 g.
8. The film of numbered embodiment 5, wherein the haze is less than 15%.
9. The film of numbered embodiment 5, wherein the film has an MD shrink less than 40% at 116° C. This is reflected in the dimensional stability data in Table 4; the negative values for the dimensional stability are indicative of shrinkage of the film, the percentage stated here is a relative value, that is, the indicated dimension of the film is smaller by (positive percentage) relative to its original size.
10. The film of any of the previous numbered embodiments, wherein the film has a TD shrink of greater than 40% at 116° C. This is reflected in the dimensional stability data in Table 4.
11. The film of any of the previous numbered embodiments, wherein the first LLDPE has a density within the range of from 0.905 to 0.920 g/cm$^3$.
12. The film any of the previous numbered embodiments, wherein the second LLDPE has a density within the range of from 0.910 to 0.935 g/cm$^3$.
13. The film any of the previous numbered embodiments, wherein the first and second LLDPEs are produced with a metallocene.
14. The film any of the previous numbered embodiments, wherein low density polyethylene produced in a high pressure radical-induced process is substantially absent from the core.
15. The film of any of the previous numbered embodiments, the core further comprising low density polyethylene produced in a high pressure radical-induced process within the range of from 0.1 to 15 wt %.
16. The film of any of the previous numbered embodiments, wherein cavitation and/or opacity-inducing agents are substantially absent.
17. The film of any of the previous numbered embodiments, wherein the core consists essentially of the first and second LLDPEs.
18. The film of any of the previous numbered embodiments, produced by extrusion and orientation through a tenter process.
19. A trash liner comprising the film any of the previous numbered embodiments.
20. A shrink label comprising the film of any of the previous numbered embodiments.
21. A method for producing a film comprising at least one core layer comprising:
    providing a short chain branched LLDPE (scb-LLDPE) having a molecular weight distribution (Mw/Mn) within the range of from 2.0 to 7.0, a density within the range of from 0.900 to 0.935 g/cm$^3$, an $I_2$ within the range of from 0.1 to 10.0 dg/min and an $I_{21}$ within the range of from 10.0 to 80.0 dg/min;
    melt blending the scb-LLDPE with 50 wt % or less, by weight of the core layer, of core additives to form a core composition; and
    extruding a film comprising the at least one core layer comprising scb-LLDPE;
    characterized in that when extruding the core composition in an extruder having a feed block and a 100 mesh (149 μm, U.S. Standard) screen upstream of the feed block, and a L/D ratio within the range of from 25/1 to 35/1, that there is a 33% or less difference between the pressure at the screen and the pressure at the feed block.
22. The method of embodiment 21, wherein the film comprises at least one core layer and at least one skin, wherein the core comprises the scb-LLDPE.
23. The method of embodiment 22, wherein the core comprises from 50 to 100 wt % of the scb-LLDPE by weight of the core.
24. The method of embodiment 21 or 22, wherein the core comprises from 70 to 100 wt % of the scb-LLDPE by weight of the core.
25. The method of any of the previous numbered embodiments 21-24, wherein the scb-LLDPE comprises short-chain branching within the range of from 5 to 30 branches per 1000 carbon atoms.
26. The method of any of the previous numbered embodiment 21-25, further comprising at least one skin layer adjacent to the at least one core layer, wherein the skin layer comprises a skin layer LLDPE.
27. The method of embodiment 26, wherein the skin layer LLDPE has an $I_2$ within the range of from 1.0 to 5.0 dg/min, and a density within the range of from 0.900 to 0.925 g/cm$^3$.
28. The method of embodiment 27, wherein there are two skin layers, the core layer being adjacent to and sandwiched there between.
29. The method of embodiment 28, wherein the film is biaxially oriented in at least a 6-fold TD orientation and at least a 3-fold MD orientation.
30. The method of embodiment 29, wherein the MD ultimate tensile strength of the film is within the range of from 30 to 130 MPa and the TD ultimate tensile strength of the film is within the range of from 100 to 200 MPa.

31. The method of embodiment 29, wherein the MD Elmendorf tear is greater than 10 g, and the TD Elmendorf tear is greater than 15 g.
32. The method of any of the previous embodiments 29-31, wherein the haze is less than 15%.
33. The method of any of the previous embodiments 29-32, wherein the film has an MD shrink of less than 40% at 116° C.
34. The method of any of the previous embodiments 29-33, wherein the film has a TD shrink of greater than 40% at 116° C.
35. The method of any of the previous embodiments 21-34, wherein the core LLDPE is produced using a metallocene.
36. The method of any of the previous embodiments 21-35, wherein the core composition is extruded at a temperature within the range of from 210 or 220 to 300 or 350° C.
37. The method of any of the previous embodiments 21-36, wherein the core additives are selected from the group consisting of radical-catalyzed high pressure LDPE, LLDPE, mLLDPE, HDPE and combinations thereof.
38. The method of any of the previous embodiments 21-37, followed by drawing the unoriented film from 1.1 to 4-fold in the machine direction and from 4 to 10-fold in the transverse direction; followed by isolating a biaxially oriented film.
39. The method of any of the previous embodiments 21-38, wherein transverse orientation is imparted to the film by first pre-heating the film, followed by a decrease in the temperature of the film within the range of from 2 to 20° C. relative to the pre-heating temperature while performing transverse orientation of the film, followed by a further lowering of the temperature within the range of from 5 to 40° C. relative to the stretching temperature.
40. The method of any of the preceding embodiments 21-39, further comprising forming the film into a trash liner.
41. The method of any of the preceding embodiments 21-40, further comprising forming the film into a shrink label.

Also disclosed herein is the use of a biaxially oriented shrink film comprising at least one core layer comprising a blend of from 20 to 80 wt %, by weight of the core layer, of a first linear LLDPE having a molecular weight distribution (Mw/Mn) within the range of from 1.0 to 4.0, a density within the range of from 0.890 to 0.920 g/cm³ and an $I_2$ within the range of from 0.1 to 4.0 dg/min; and from 80 to 20 wt %, by weight of the core layer, of a second LLDPE having a molecular weight distribution (Mw/Mn) within the range of from 1.0 to 7.0, a density within the range of from 0.900 to 0.935 g/cm³ and an $I_2$ within the range of from 0.5 to 10.0 dg/min; wherein the density of the second LLDPE is greater than the density of the first LLDPE by at least 0.002 g/cm³; and/or the $I_2$ of the second LLDPE is greater than the $I_2$ of the first LLDPE by at least 0.5 dg/min.

The use may also be that of a biaxially oriented film, as described, in a shrink label.

The invention claimed is:
1. A biaxially oriented film comprising at least one core layer comprising a blend of:
   from 40 to 60 wt %, by weight of the core layer, of a first linear low density polyethylene ("LLDPE") having a molecular weight distribution (Mw/Mn) within the range of from 1.0 to 4.0, a density within the range of from 0.890 to 0.920 g/cm³ and a melt index (ASTM D1238, 190° C./2.16 kg, "$I_2$" within the range of from 0.1 to 4.0 dg/min; and
   from 60 to 40 wt %, by weight of the core layer, of a second LLDPE having a molecular weight distribution (Mw/Mn) within the range of from 1.0 to 3.5, a density within the range of from 0.900 to 0.935 g/cm³ and an $I_2$ within the range of from 0.5 to 10.0 dg/min; and
   from 0.1 to 15 wt %, by weight of the core layer, of a HP-LDPE;
   wherein the density of the second LLDPE is greater than the density of the first LLDPE by at least 0.002 g/cm³; and/or the $I_2$ of the second LLDPE is greater than the $I_2$ of the first LLDPE by at least 0.5 dg/min, and the film has a haze value of less than 10%.
2. The film of claim 1, further comprising at least one skin layer adjacent to the at least one core layer, wherein the skin layer comprises a skin layer LLDPE.
3. The film of claim 2, wherein the skin layer LLDPE has an $I_2$ within the range of from 1.0 to 5.0 dg/min, and a density within the range of from 0.900 to 0.925 g/cm³.
4. The film of claim 3, wherein there are two skin layers, the core layer being adjacent to and sandwiched there between.
5. The film of claim 4, wherein the film is biaxially oriented with at least a 6-fold TD orientation and at least a 3-fold MD orientation.
6. The film of claim 5, wherein the MD ultimate tensile strength is within the range of from 30 to 130 MPa and the TD ultimate tensile strength is within the range of from 100 to 200 MPa.
7. The film of claim 5, wherein the film has an MD shrink of less than 40% at 116° C.; and wherein the film has a TD shrink of greater than 40% at 116° C.
8. The film of claim 1, wherein cavitation and/or opacity-inducing agents are absent.
9. A trash liner comprising the film of claim 1.
10. A shrink label comprising the film of claim 1.
11. A method for producing a film comprising at least one core layer comprising:
   providing a short chain branched LLDPE (scb-LLDPE) having a molecular weight distribution (Mw/Mn) within the range of from 2.0 to 3.5, a density within the range of from 0.900 to 0.935 g/cm³, an $I_2$ within the range of from 0.1 to 10.0 dg/min and an $I_{21}$ within the range of from 10.0 to 80.0 dg/min;
   melt blending the scb-LLDPE with 50 wt % or less, by weight of the core layer, of core additives to form a core composition which includes a linear LLDPE having a molecular weight distribution (Mw/Mn) within the range of from 1.0 to 4.0, a density within the range of from 0.890 to 0.920 g/cm³ and an $I_2$ within the range of from 0.1 to 4.0 dg/min; and
   extruding a film comprising the at least one core layer comprising scb-LLDPE;
   wherein when extruding the core composition in an extruder having a feed block and a 100 mesh (149 μm, U.S. Standard) screen upstream of the feed block, and a L/D ratio within the range of from 25/1 to 35/1, that there is a 33% or less difference between the pressure at the screen and the pressure at the feed block.
12. The method of claim 11, wherein the film comprises at least one core layer and at least one skin, wherein the core comprises the scb-LLDPE.
13. The method of claims 11, wherein transverse orientation is imparted to the film by first pre-heating the film, followed by a decrease in the temperature of the film within the range of from 2 to 20° C. relative to the pre-heating temperature while performing transverse orientation of the film, followed by a further lowering of the temperature within the range of from 5 to 40° C. relative to the stretching temperature.

* * * * *